US009319560B1

(12) United States Patent
Kurigata

(10) Patent No.: US 9,319,560 B1
(45) Date of Patent: Apr. 19, 2016

(54) IMAGE DEFORMATION DEVICE

(71) Applicant: KONICA MINOLTA, INC., Chiyoda-ku, Tokyo (JP)

(72) Inventor: Yuhei Kurigata, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/851,616

(22) Filed: Sep. 11, 2015

(30) Foreign Application Priority Data

Oct. 6, 2014 (JP) .................................. 2014-205702

(51) Int. Cl.
*H04N 1/407* (2006.01)
*H04N 1/387* (2006.01)
*H04N 1/21* (2006.01)
*H04N 1/32* (2006.01)
*H04N 1/12* (2006.01)
*G06T 5/00* (2006.01)

(52) U.S. Cl.
CPC ............. *H04N 1/387* (2013.01); *H04N 1/121* (2013.01); *H04N 1/2104* (2013.01); *H04N 1/32491* (2013.01)

(58) Field of Classification Search
CPC ..... H04N 1/387; H04N 1/121; H04N 1/2104; H04N 1/32491
See application file for complete search history.

(56) References Cited

U.S. PATENT DOCUMENTS 8,040,555 B1 * 10/2011 Keithley ................. H04N 1/047 347/132
8,897,592 B2 * 11/2014 Yoo .......................... G06T 5/005 348/242

FOREIGN PATENT DOCUMENTS

JP 2009-122763 A 6/2009

* cited by examiner

*Primary Examiner* — Quang N Vo
(74) *Attorney, Agent, or Firm* — Buchanan Ingersoll & Rooney PC

(57) ABSTRACT

Disclosed is an image deformation device, including: a primary memory in which a positional correction amount data for each pixel, is stored; a reference memory having a smaller storing area than the primary memory; a transfer unit configured to transfer the positional correction amount data stored in the primary memory to the reference memory separately in multiple times; and a positional correction unit configured to carry out a positional correction process, wherein the transfer unit transfers the positional correction amount data according to the predetermined order and a progress of the positional correction process in the positional correction unit so that the positional correction amount data for one pixel has been already stored in the reference memory when the positional correction unit corrects the position of the one pixel.

15 Claims, 15 Drawing Sheets

POSITIONAL CORRECTION
AMOUNT FOR EACH PIXEL
IN INPUT IMAGE

DIFFERENTIAL DATA

CONVERT DIFFERENCE
WITH RESPECT TO LEFT SIDE PIXEL
BLACK CIRCLE: REFERENCE PIXEL
ARROW: REFERRING DIRECTION

DECODE DIFFERENTIAL DATA TO
POSITIONAL CORRECTION AMOUNT DATA
IN POSITIONAL CORRECTION UNIT

POSITIONAL CORRECTION PROCESS
(GRAY CIRCLE: CORRECTED POSITION)

POSITIONAL CORRECTION AMOUNT FOR EACH PIXEL IN INPUT IMAGE

POSITIONAL CORRECTION PROCESS (GRAY CIRCLE: CORRECTED POSITION)

IMAGE DEFORMATION DEVICE

BACKGROUND OF THE INVENTION

1. Field of the Invention

The present invention relates to an image deformation device for deforming an input image by correcting the pixel position of each pixel in the input image.

2. Description of Related Art

In an image output device, such as a printer using an electrophotographic process, or the like, because an output image is deformed due to the fixing and/or the irregularity of the paper feeding, the deformation of the output image is suppressed by deforming the image data in a direction opposite to the deforming direction.

In case that an image deformation process is a simple correcting process, such as the enlargement (or the reduction) shown in FIG. 12, the rotation shown in FIG. 13 or the like, by inputting the parameter, such as the rotation angle, the magnification or the like, to the deformation processing unit, the deformation processing unit can calculate the positional shift amount of each pixel based on the parameter and deform the image.

However, because the actual deformation (distortion) of the output image, which is caused in an image output device, is complicated due to a plurality of factors, in order to correct the above deformation, a complicated deformation process shown in FIG. 14 is required. Therefore, it is not possible to completely eliminate the deformation of the output image by a simple correction, such as the rotation, the enlargement, the reduction or the like, which can be carried out by using the above calculation.

Accordingly, in order to eliminate the distortion based on the actual value of the distortion of the output image, the positional correction amount for each pixel (the shift amount in the vertical direction and the shift amount in the horizontal direction) is previously calculated and is stored in a memory. Then, by reading the positional correction amount for each pixel from the memory, the position of each pixel is corrected. As a result, various types of image deformation can be corrected and the positional correction can be carried out more precisely (See FIG. 15). However, in this case, because the positional correction amount for each pixel is held, an enormous memory for storing the positional correction amount is required.

In a general printer, there are some cases in which the number of pixels in one page is about 80 mega pixels when the resolution of the image is 600 dpi. When it is assumed that 16 bit data is held as the positional correction amount for one pixel having four colors, it is required that the memory has the capacity of 1 Gbits in order to hold the positional correction amounts for one page.

Because the image deformation process for cancelling the distortion of the output image is generally carried out in real time during the output of the image, the image deformation process is carried out by using the image processing LSI (Large Scale Integration) which can carry out the high speed processing. In case that the above positional correction amount data for each pixel is stored in the SRAM (Static Random Access Memory) of the image processing LSI, to which the correction unit of the image processing LSI refers, the necessary capacity of the SRAM is increased and the size of the image processing LSI is enlarged. As a result, the image deformation device becomes extremely expensive, or it is actually impossible to include the SRAM in the image processing LSI.

As a technology for reducing the data size of the positional correction amounts to be held in the image processing LSI, for example, the following image processing controller is disclosed in Japanese Patent Application Publication No. 2009-122763. In this image processing controller, the positional correction amount data for only the pixels arranged at intervals after the thinning out is held, and the positional correction amount for the thinned pixels is calculated based on the held data to deform the image to be displayed on the display unit.

In an image output device, such as a printer or the like, the resolution of the image is high as compared with a display unit, and the number of pixels is extremely large. Therefore, although the technology disclosed in Japanese Patent Application Publication No. 2009-122763 is applied, it is required to largely thin the data. As a result, the precision of the positional correction is significantly deteriorated.

SUMMARY

To achieve at least one of the abovementioned objects, an image deformation device for deforming an input image by correcting a position of each pixel in the input image, reflecting one aspect of the present invention, comprises:

a primary memory in which a positional correction amount data for each pixel, which is used for correcting the position of each pixel, is stored;

a reference memory having a smaller storing area than the primary memory;

a transfer unit configured to transfer the positional correction amount data stored in the primary memory to the reference memory separately in multiple times; and a positional correction unit configured to carry out a positional correction process in which the position of each pixel in the input image is sequentially corrected in a predetermined order in accordance with the positional correction amount data stored in the reference memory, wherein the transfer unit transfers the positional correction amount data according to the predetermined order and a progress of the positional correction process in the positional correction unit so that the positional correction amount data for one pixel has been already stored in the reference memory when the positional correction unit corrects the position of the one pixel.

Preferably, in the input image, the pixels are arranged in a first direction and in a second direction which is perpendicular to the first direction, the predetermined order is an order in which the position of each pixel in one line in the first direction is corrected sequentially from a top line to a bottom line along the second direction, and the transfer unit transfers the positional correction amount data for the one line in the first direction as a unit of data transfer.

Preferably, the primary memory is a dynamic random access memory.

Preferably, the reference memory comprises a first reference memory and a second reference memory, every when the positional correction unit corrects the positions of a predetermined number of the pixels, the positional correction unit switches a reference destination of the positional correction amount data between the first reference memory and the second reference memory alternately, and the transfer unit transfers the positional correction amount data for the predetermined number of the pixels as a unit of data transfer, by switching a transfer destination of the positional correction amount data between the first reference memory and the second reference memory alternately.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENTS

Hereinafter, preferred embodiments of the present invention will be explained with reference to the accompanying drawings.

First Embodiment

Figure 1:
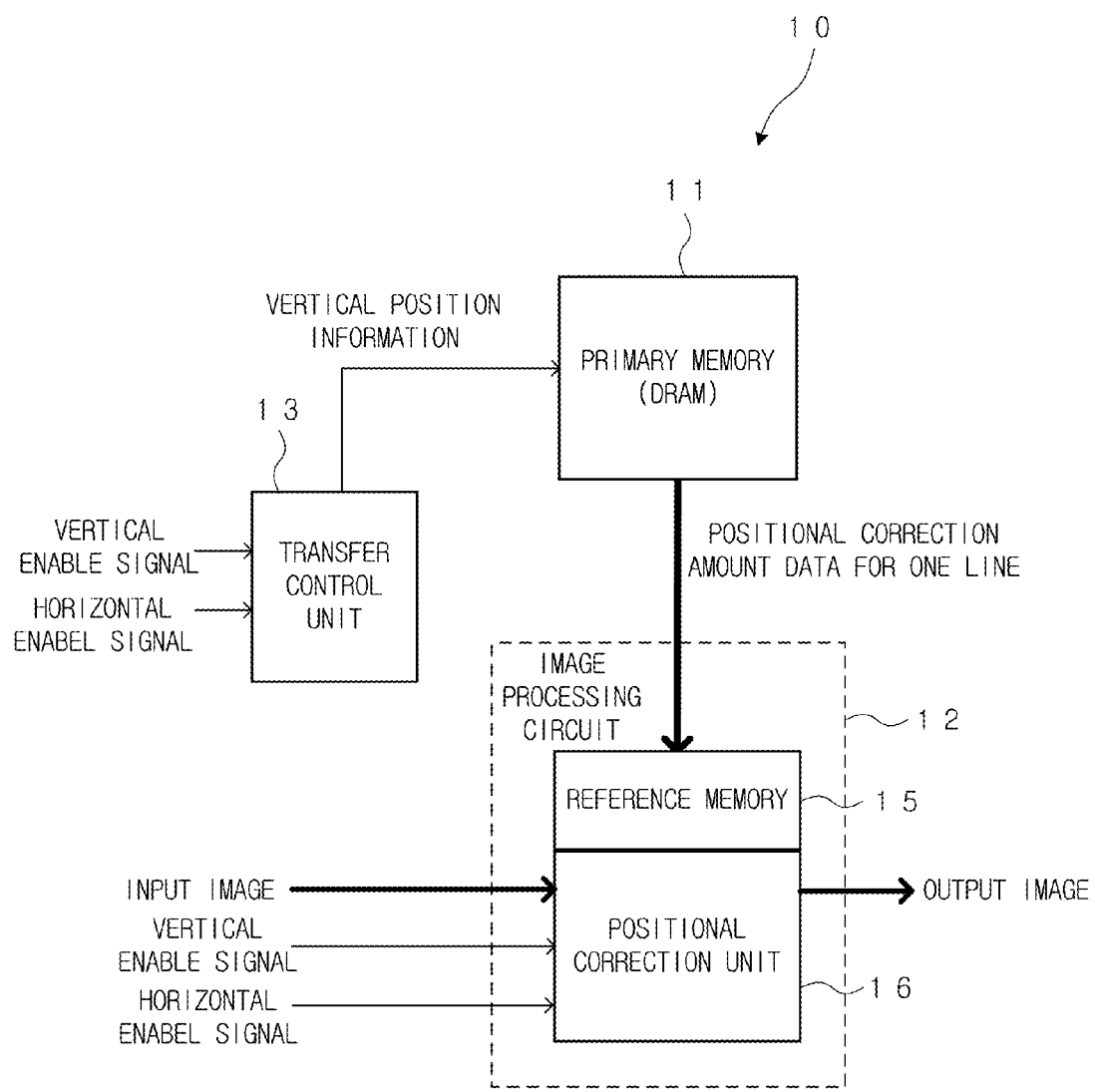
FIG. 1 is a block diagram showing the schematic configuration of the image deformation device according to the first embodiment.

FIG. 1 is a block diagram showing the schematic configuration of the image deformation device 10 according to the first embodiment. The image deformation device 10 has the function for generating an output image in which the position of each pixel in an input image is changed to the intended position of each pixel.

The input image to be processed is an image having the dot matrix form in which the pixels are arranged in the first direction and in the second direction which is perpendicular to the first direction. Further, the output image is also an image having the dot matrix form in which the pixels are arranged in the first direction and in the second direction which is perpendicular to the first direction. In this case, the first direction is the horizontal direction and the second direction is the vertical direction.

For example, the image deformation device 10 is provided on the previous stage or the like of the laser unit of the laser printer. The image signal is output to the laser diodes of the laser unit via the image deformation device 10. In the image deformation device 10, the image data of each pixel is sequentially input in the order of the output of the image data of each pixel to the laser unit. When the image is formed by using the laser unit, the image deformation process is carried out in real time in parallel with the image forming. Specifically, in the image deformation device 10, the image data of one line in the horizontal direction is input in the order from the top of one page (the line which is arranged at the head in the vertical direction) to the bottom of one page. In each line in the horizontal direction, the image data of each pixel is sequentially input in the order from the leading pixel of the line to the trailing pixel of the line.

The image deformation device 10 comprises a primary memory 11, an image processing circuit 12 and a transfer control unit 13. The image processing circuit 12 comprises a reference memory 15 and a positional correction unit 16 therein. The image processing circuit 12 is configured as an integrated circuit, such as ASIC (Application Specific Integrated Circuit) or the like.

The primary memory 11 is a memory which is provided outside the image processing circuit 12. In this case, the primary memory 11 is a DRAM (Dynamic Random Access Memory). In the primary memory 11, the positional correction amount data is stored. The positional correction amount data is the data indicating the shift amount of each pixel with respect to the position of the pixel which is arranged before the position of the pixel is corrected. In the primary memory 11, the positional correction amount data for each pixel in the image of one page is stored. Alternatively, in the primary memory 11, the positional correction amount data for a plurality of pages may be stored.

The reference memory 15 is an SRAM (Static Random Access Memory) provided in the image processing circuit 12. The reference memory 15 holds the positional correction amount data for each pixel in one line in the horizontal direction. Alternatively, the reference memory 15 may hold the positional correction amount data for a plurality of lines.

The transfer control unit 13 transfers the positional correction amount data stored in the primary memory 11 to the reference memory 15 as the transfer unit, separately in multiple times.

The positional correction unit 16 carries out the positional correction process for sequentially correcting the position of each pixel in the input image which is sequentially input in the above order, in accordance with the positional correction amount data stored in the reference memory 15. The corrected image is output as the output image.

Specifically, in addition to the input image, the vertical enable signal and the horizontal enable signal are input to the positional correction unit 16. The vertical enable signal and the horizontal enable signal are signals output from the image output device (the printer engine unit) when the printing is carried out. The vertical enable signal is a signal which is switched ON (High) immediately before the printing of the top line of one page is started when the image of this page is printed, and which is switched OFF when the printing of the bottom line of this page is finished. The horizontal enable signal is a signal which is output for each line in the horizontal direction, and which is switched ON immediately before the printing of the leading pixel of the line is started and is switched OFF when the process for the trailing pixel of the line is finished.

The positional correction unit 16 judges that the effective input image is input when the vertical enable signal is ON and the horizontal enable signal is ON, and carries out the positional correction process for the input image which is input when the enable signals are ON.

In this case, the transfer control unit 13 transfers the positional correction amount data according to the order in which each pixel in the input image is input to the image processing circuit 12 and the progress of the positional correction process in the positional correction unit 16 so that the positional correction amount data for one pixel to be corrected has been already stored in the reference memory 15 when the positional correction is carried out for this pixel by the positional correction unit 16.

The vertical enable signal and the horizontal enable signal are also input to the transfer control unit 13. The transfer control unit 13 recognizes the line for which the positional correction unit 16 carries out the positional correction process next, in accordance with the vertical enable signal and the horizontal enable signal. Then, the positional correction amount data for one line corresponding to the line for which the positional correction unit 16 carries out the positional correction process next, is transferred to the reference memory 15 immediately before the positional correction unit 16 carries out the positional correction process for this line.

Specifically, the transfer control unit 13 generates the vertical position information indicating the vertical position of the line for which the positional correction unit 16 carries out the positional correction process next, in accordance with the vertical enable signal and the horizontal enable signal, and outputs the vertical position information as the reading out address to the primary memory 11. When the primary memory 11 receives the reading out address, the primary memory 11 successively outputs the positional correction amount data for one line which is designated by the reading out address. The image processing circuit 12 sequentially receives the positional correction amount data for one line, which is output from the primary memory 11, and stores the positional correction amount data in the reference memory 15.

Figure 2:
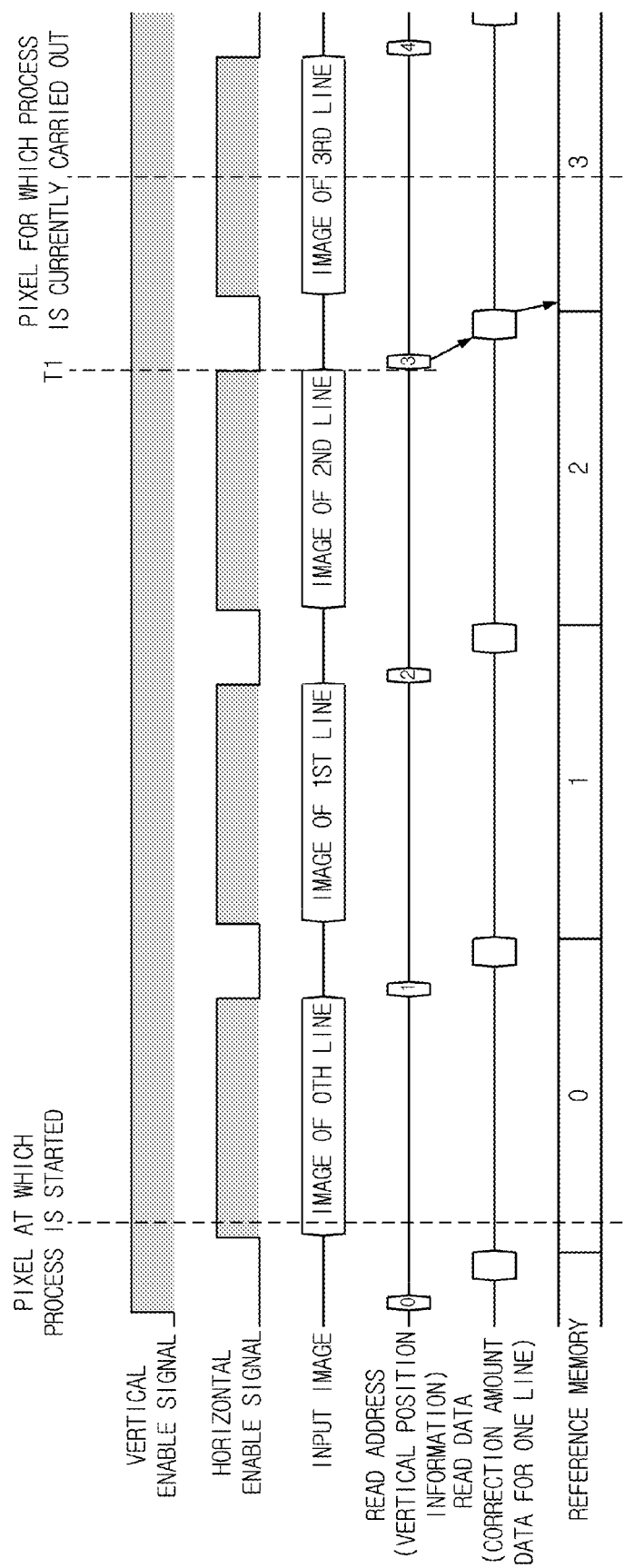
FIG. 2 is a timing chart showing the operation of the image deformation device according to the first embodiment.

FIG. 2 is a timing chart showing the operation of the image deformation device 10. At the starting of the process for one page, the vertical enable signal is switched ON. Then, the vertical enable signal is ON until the process for this page is finished, and at the finish of the process for this page, the vertical enable signal is OFF. The horizontal enable signal is ON while the input image of one line in the horizontal direction is input, and is switched OFF at the finish of the process for the input image of this line. Then, the horizontal enable signal is switched ON immediately before the process for the input image of the next line is started. The positional correction unit 16 carries out the positional correction process for the image of one line, which is input while the horizontal enable signal is ON, in real time. The horizontal enable signal corresponding to the first line is switched ON soon after the vertical enable signal is switched ON.

As described above, the image processing is carried out for each line. Between two lines, there is an invalid time region (the time period in which the effective image is not input) in which the horizontal enable signal is OFF. Therefore, the positional correction amount data for one line corresponding to the line for which the positional correction unit 16 carries out the positional correction process next, is transferred from the primary memory 11 to the reference memory 15 during the invalid time region immediately before the above line.

In FIG. 2, the line including the pixels for which the positional correction unit 16 currently carries out the positional correction process is the third line. When the transfer control unit 13 detects the finish of the process for the second line (the switching OFF of the horizontal enable signal for the second line) (time T1), the transfer control unit 13 outputs the transfer request and the vertical position information indicating the third line to the primary memory 11. In response to this, the primary memory 11 carries out the burst output of the positional correction amount data for the third line (the positional correction amount data for one line) as the read data. The image processing circuit 12 fetches the read data and stores the read data in the reference memory 15. As described above, before the positional correction unit 16 starts the positional correction process for the input image of the third line, the positional correction amount data for the third line is transferred from the primary memory 11 to the reference memory 15.

Figure 3:
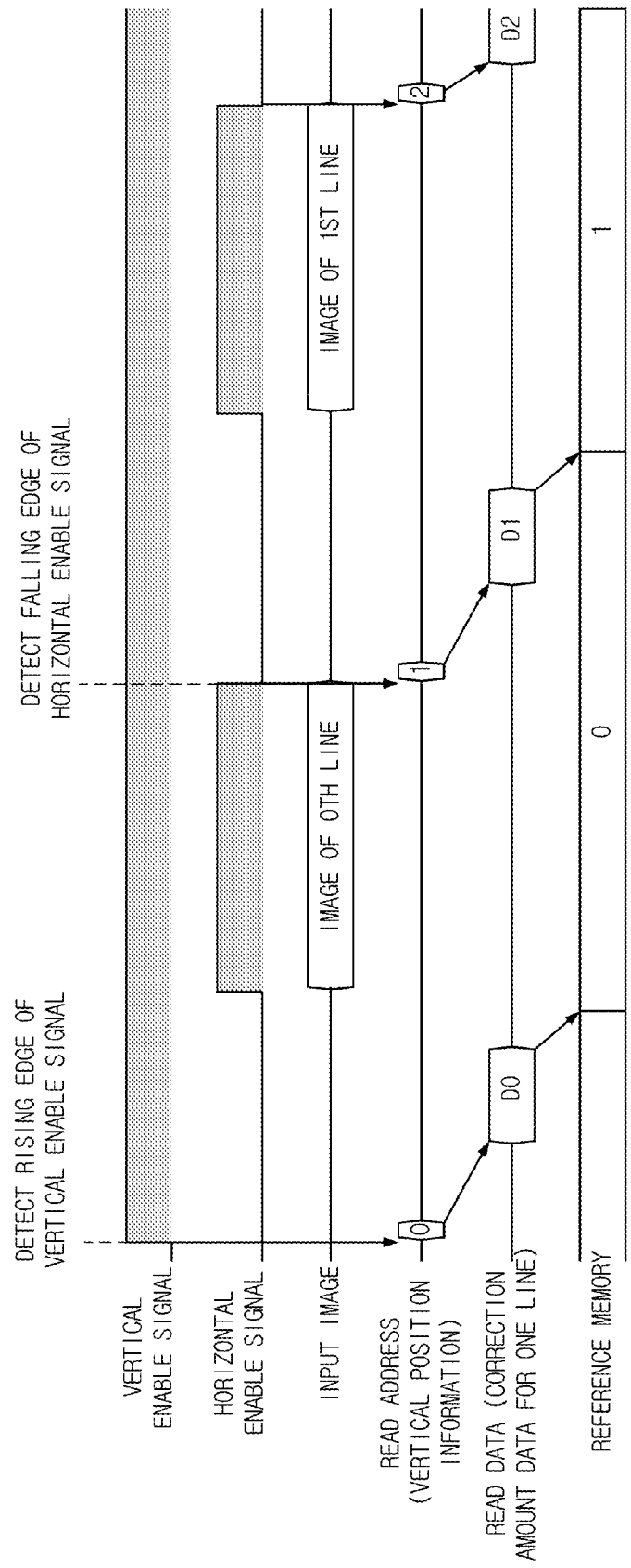
FIG. 3 is a view showing an example of the count-up timing of the vertical position information.

FIG. 3 shows an example of the count-up timing of the vertical position information. In case of FIG. 3, the transfer control unit 13 detects the rising edge of the vertical enable signal and outputs the vertical position information of the top line (read address "0") and the transfer request by using the above rising edge as the trigger. In the subsequent process, every when the transfer control unit 13 detects the falling edge of the horizontal enable signal, the transfer control unit 13 counts up the vertical position information. Then, the transfer control unit 13 outputs the counted-up vertical position information and the transfer request to the primary memory 11. In case of FIG. 3, the transfer of the positional correction amount data for the top one line is finished during the time period from the rising edge of the vertical enable signal to the first rising edge of the horizontal enable signal.

Figure 4:
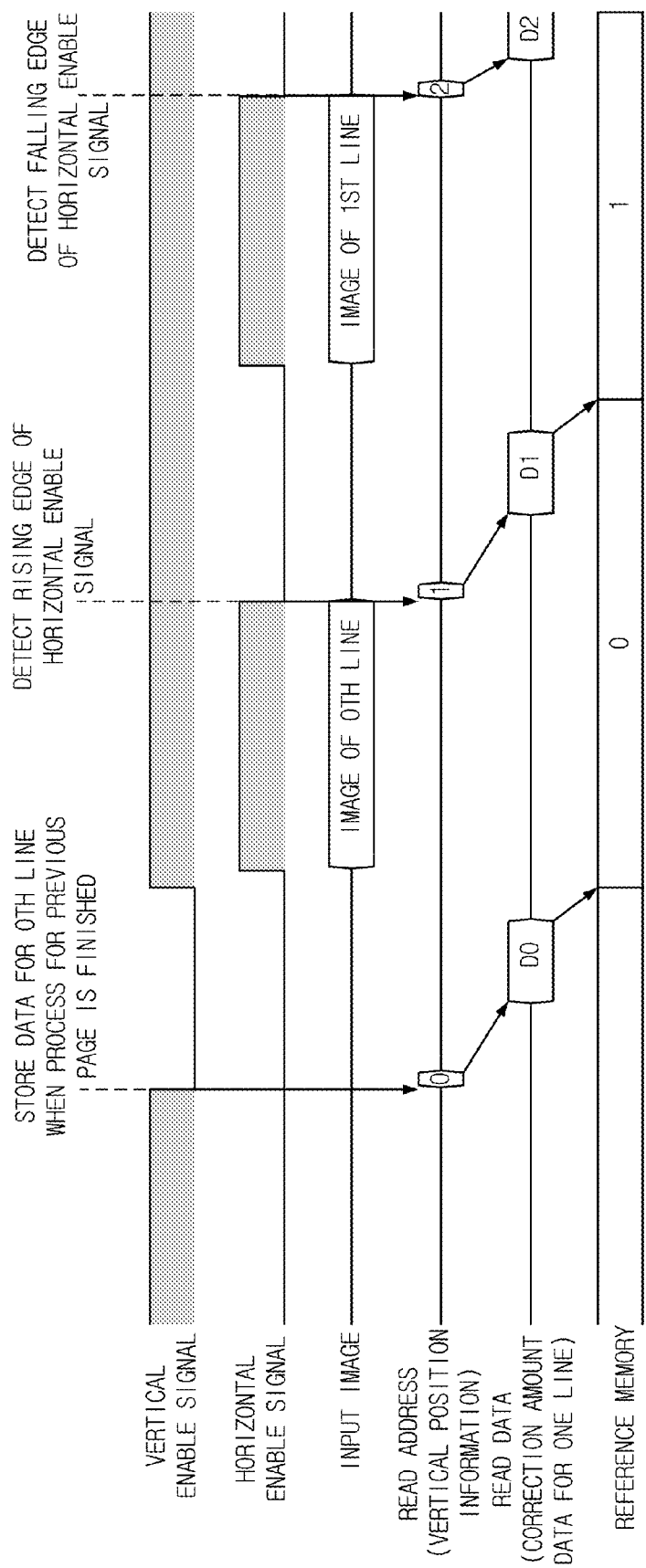
FIG. 4 is a view showing an example of the output timing and the count-up timing of the vertical position information in case that the initial transfer request is antecedently sent.

FIG. 4 shows an example of the output timing of the transfer request in case that the positional correction amount data for the top one line cannot be transferred during the time period from the rising edge of the vertical enable signal to the first rising edge of the horizontal enable signal because the above time period is short. In this example, at the finish of the process for the previous page (when the transfer control unit 13 detects the falling edge of the vertical enable signal for the previous page), the transfer control unit 13 outputs the vertical position information of the top line (read address "0") and the transfer request. In the subsequent process, like the case shown in FIG. 3, every when the transfer control unit 13 detects the falling edge of the horizontal enable signal, the transfer control unit 13 counts up the vertical position information and outputs the counted-up vertical position information and the transfer request.

However, the above method cannot be used for the image of the first page. Therefore, in order to finish the transfer of the positional correction amount data for one line from the primary memory 11 to the reference memory 15 before the first rising of the horizontal enable signal for the first page, at the starting of the printing, the transfer starting command is output to the transfer control unit 13 by the upper level process before the printing is actually started in the print engine unit. When the transfer control unit 13 receives the transfer starting command, the transfer control unit 13 may output the vertical position information of the top line (read address "0") and the transfer request to the primary memory 11.

As described above, in the image deformation device 10 according to the first embodiment, the positional correction amount data for one or more pages is held in the primary memory 11 (DRAM) provided outside the image processing circuit 12. The positional correction amount data is sequentially transferred from the primary memory 11 to the reference memory 15 according to the order and the progress of the process in the positional correction unit 16. Therefore, it is possible to sufficiently suppress the memory size of the reference memory 15 included in the image processing circuit 12.

In particular, because the positional correction amount data for the next line is transferred from the primary memory 11 to the reference memory 15 during the invalid time region in which the horizontal enable signal is OFF between the lines, in the reference memory 15, only the positional correction amount data for one line is held. It is possible to sufficiently suppress the memory size of the reference memory 15 included in the image processing circuit 12 and to carry out the precise image deformation in which the positional correction amount data for each pixel is used.

Second Embodiment

In the first embodiment, the positional correction amount data held in the reference memory 15 is updated by transferring the positional correction amount data from the primary memory 11 to the reference memory 15 at the timing immediately before the staring of the positional correction process for each line (during the invalid time region). However, in case that the time period (the invalid time region) between the valid time region (in which the horizontal enable signal is ON (effective)) for one line and the valid time region for the next line is extremely short, or in case that the transfer speed of the data from the DRAM is not sufficient, all of the positional correction amount data for one line cannot be transferred during the above invalid time region. As a result, the positional correction process cannot be normally carried out. The second embodiment is one for solving the above problem.

Figure 5:
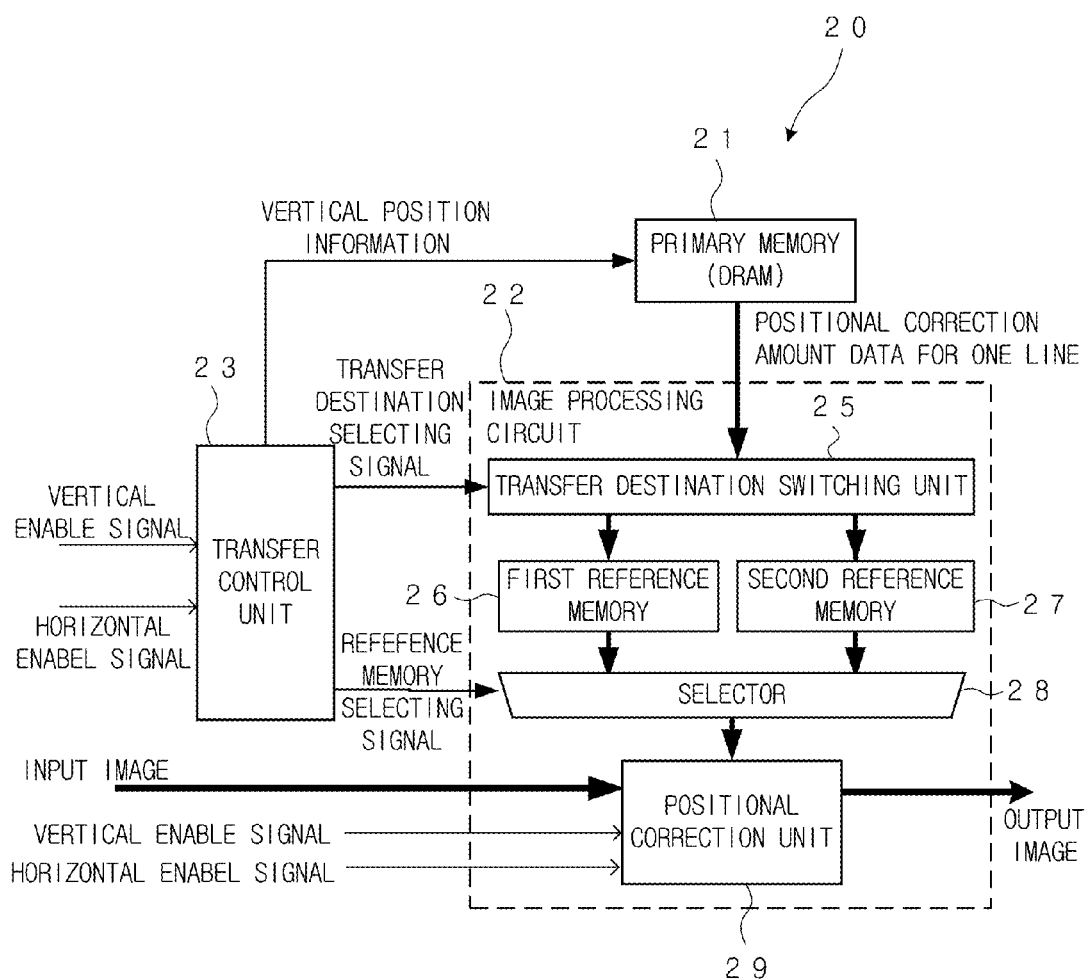
FIG. 5 is a block diagram showing the schematic configuration of the image deformation device according to the second embodiment.

FIG. 5 shows the configuration of the image deformation device 20 according to the second embodiment. The image deformation device 20 comprises a primary memory 21, an image processing circuit 22 and a transfer control unit 23. The image processing circuit 22 comprises a transfer destination switching unit 25, a first reference memory 26, a second reference memory 27, a selector 28 and a positional correction unit 29 therein. The image processing circuit 22 is configured as an integrated circuit, such as ASIC or the like, like the image processing circuit 12.

The primary memory 21 is the same as the primary memory 11 according to the first embodiment.

The image deformation device 20 comprises the first reference memory 26 and the second reference memory 27 which correspond to the reference memory 15 according to the first embodiment. Each of the first reference memory 26 and the second reference memory 27 is an SRAM provided in the image processing circuit 22, and holds the positional correction amount data for each pixel in one line in the horizontal direction.

The transfer destination switching unit 25 switches the destination of the positional correction amount data output from the primary memory 21 between the first reference memory 26 and the second reference memory 27 alternately.

The selector 28 switches the reference destination for referring to the positional correction amount data by the positional correction unit 29 between the first reference memory 26 and the second reference memory 27 alternately.

The transfer control unit 23 transfers the positional correction amount data stored in the primary memory 21 to the first reference memory 26 and the second reference memory 27 alternately as the transfer unit, separately in multiple times. The transfer control unit 23 outputs the transfer destination selecting signal for indicating that the positional correction amount data output from the primary memory 21 is transferred to the first reference memory 26 or the second reference memory 27, to the transfer destination switching unit 25. The transfer destination switching unit 25 switches the transfer destination in accordance with the transfer destination selecting signal input from the transfer control unit 23.

Further, the transfer control unit 23 outputs the reference memory selecting signal indicating that the reference destination for referring to the positional correction amount data by the positional correction unit 29 is set to the first reference memory 26 or the second reference memory 27, to the selector 28. The selector 28 switches the reference destination for referring to the positional correction amount data by the positional correction unit 29, in accordance with the reference memory selecting signal input from the transfer control unit 23.

The positional correction unit 29 carries out the positional correction process which is the same as the process carried out by the positional correction unit 16 of the image deformation device 10, by referring to the positional correction amount data output from the selector 28.

In detail, the transfer control unit 23 outputs the transfer destination selecting signal so as to change the transfer destination of the positional correction amount data for one line alternately between the first reference memory 26 and the second reference memory 27. For example, the positional correction amount data for the 0th line (top line) is transferred to the first reference memory 26 as the transfer destination. Then, the positional correction amount data for the first line is transferred to the second reference memory 27 as the transfer destination. The positional correction amount data for the second line is transferred to the first reference memory 26 as the transfer destination. The positional correction amount data for the third line is transferred to the second reference memory 27 as the transfer destination.

Similarly, the transfer control unit 23 outputs the reference memory selecting signal so as to change the reference destination of the positional correction amount data between the first reference memory 26 and the second reference memory 27 alternately line by line. For example, when the positional correction unit 29 carries out the positional correction process for each pixel in the 0th line, the reference destination of the positional correction amount data is set to the first reference memory 26. When the positional correction unit 29 carries out the positional correction process for each pixel in the first line, the reference destination of the positional correction amount data is set to the second reference memory 27. When the positional correction unit 29 carries out the positional correction process for each pixel in the second line, the reference destination of the positional correction amount data is set to the first reference memory 26. When the positional correction unit 29 carries out the positional correction process for each pixel in the third line, the reference destination of the positional correction amount data is set to the second reference memory 27.

The transfer control unit 23 transfers the positional correction amount data from the primary memory 21 to the first reference memory 26 or the second reference memory 27 when the positional correction unit 29 does not refer to the positional correction amount data in the reference memory which is the transfer destination. For example, while the positional correction unit 29 carries out the positional correction process by referring to the data in the first reference memory 26, the transfer control unit 23 transfers the positional correction amount data for the next line to the second reference memory 27. While the positional correction unit 29 carries out the positional correction process by referring to the data in the second reference memory 27, the transfer control unit 23 transfers the position correction amount data for the next line to the first reference memory 26.

Figure 6:
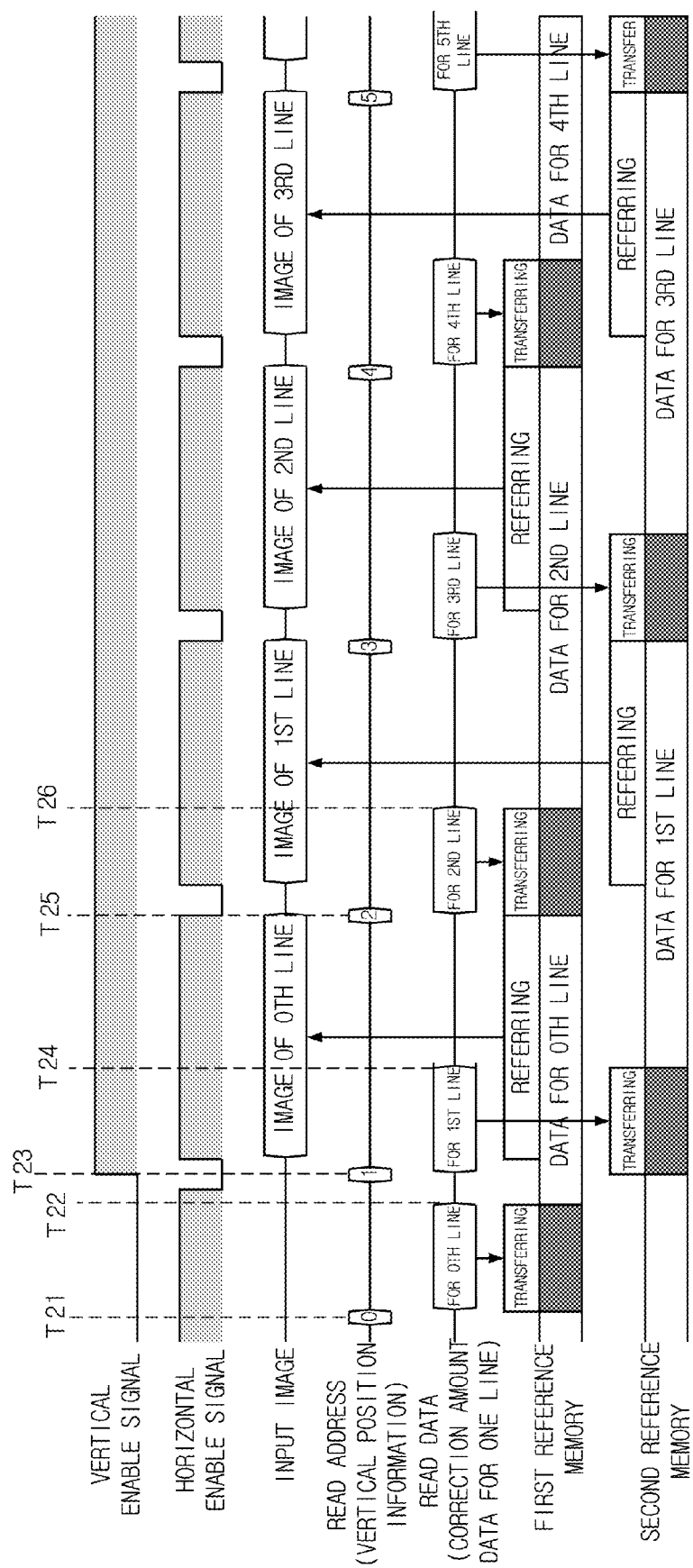
FIG. 6 is a timing chart showing the operation of the image deformation device according to the second embodiment.

FIG. 6 is a timing chart showing the operation of the image deformation device 20. Firstly, before the vertical enable signal is switched ON, the positional correction amount data for the top line (0th line) is transferred from the primary memory 21 to the first reference memory 26 (time T21 to T22). Next, at the timing of the switching ON of the vertical enable signal, the positional correction amount data for the next line (first line) is transferred from the primary memory 21 to the second reference memory 27 (time T23 to T24). During the transfer of the positional correction amount data for the first line, the image data of the 0th line has been already input, and the positional correction unit 29 carries out the positional correction process for each pixel in the 0th line by referring to the positional correction amount data in the first reference memory 26.

Next, when the image processing for the 0th line is finished and the horizontal enable signal is switched OFF (time T25), the reference of the data in the first reference memory 26 by the positional correction unit 29 is finished. Therefore, the transfer control unit 23 transfers the positional correction amount data for the second line from the primary memory 21 to the first reference memory 26 (time T25 to T26). During this transfer, the image data of the first line is input and the positional correction unit 29 carries out the positional correction process by referring to the positional correction amount data in the second reference memory 27.

As described above, the image deformation device 20 comprises two reference memories which are the first reference memory 26 and the second reference memory 27. The positional correction unit 29 refers to the data in these memories alternately. Then, the transfer control unit 23 transfers the positional correction amount data for the next line to the reference memory to which the positional correction unit 29 does not refer. Therefore, it is possible to normally transfer the positional correction amount data even though the invalid time region between the lines is short.

Third Embodiment

In the first and the second embodiments, the positional correction amount data for one page or a plurality of pages is stored in the primary memory 11 or 21 which is the DRAM. However, because the memory size for which the positional correction amount data can be stored in the DRAM as the primary memory is limited, there are some cases in which the positional correction amount data for one page cannot be stored. Therefore, in the third embodiment, as the primary memory, a main memory or a hard disk drive which can secure the large capacity is used.

Because there are some cases in which the readout of the data from the hard disk drive is delayed as compared with the DRAM, the transfer of the data is too slow in the method in which the positional correction amount data is directly transferred from the hard disk drive to the reference memory 15 in the image processing circuit 12. Even though the first reference memory 26 and the second reference memory 27 are used alternately as shown in the second embodiment, it takes a long time to read out the data from the hard disk drive and the transfer of the data is too slow in the method in which the positional correction amount data is directly transferred from the hard disk drive to the reference memory 26 or 27.

In the third embodiment, the transfer of the data is carried out at two stages, that is, the positional correction amount data is transferred from the hard disk drive to the DRAM and further the positional correction amount data is transferred from the DRAM to the SRAM in the image processing circuit 33.

Figure 7:
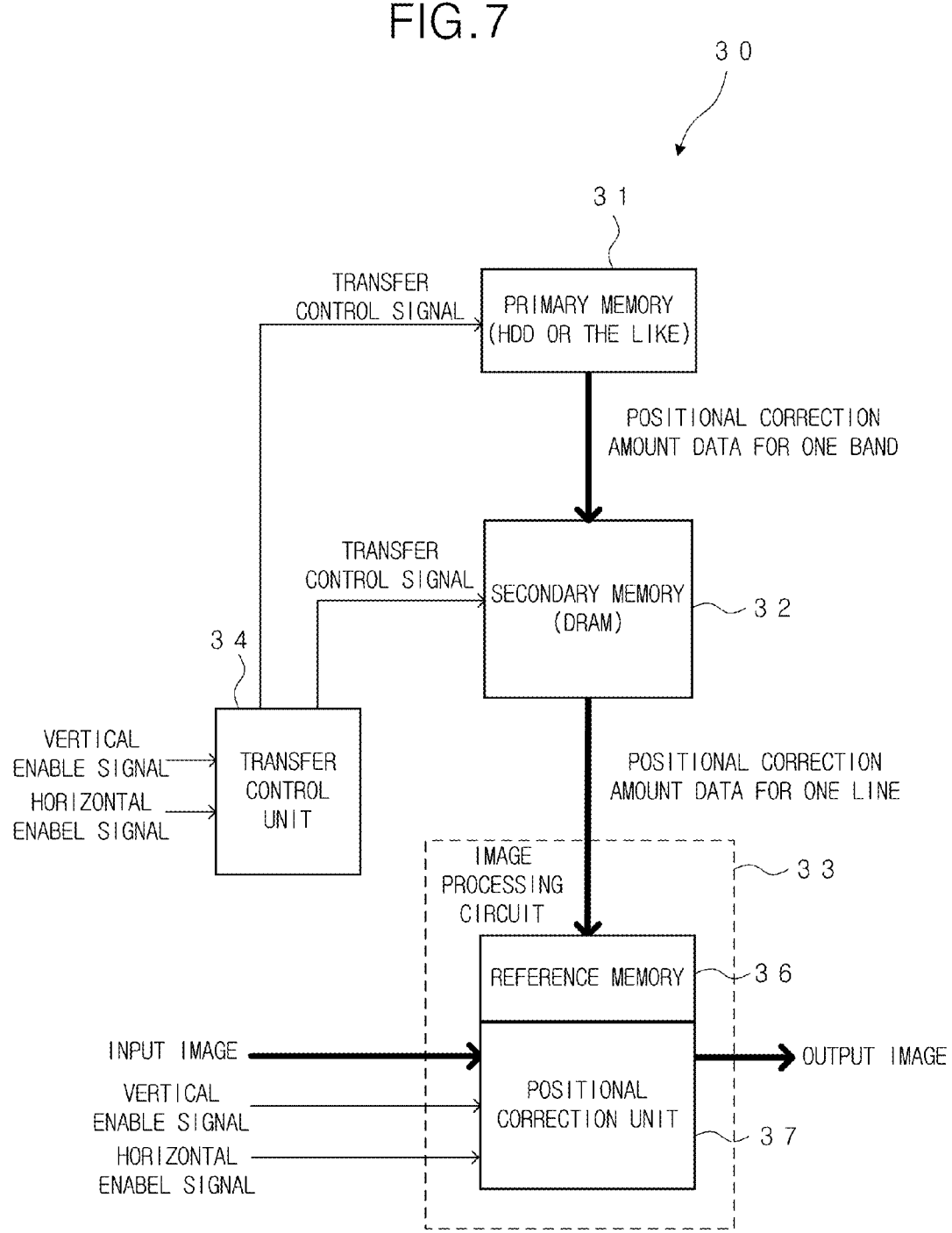
FIG. 7 is a block diagram showing the schematic configuration of the image deformation device according to the third embodiment.

FIG. 7 shows the schematic configuration of the image deformation device 30 according to the third embodiment. The image deformation device 30 comprises a primary memory 31, a secondary memory 32, an image processing circuit 33 and a transfer control unit 34. The image processing circuit 33 comprises a reference memory 36 and a positional correction unit 37 therein. The image processing circuit 33 is configured as an integrated circuit, such as ASIC or the like.

The primary memory 31 is a large-capacity memory device, such as a hard disk drive provided outside the image processing circuit 33. In the primary memory 31, the positional correction amount data for one page or a plurality of pages is stored.

Figure 8:
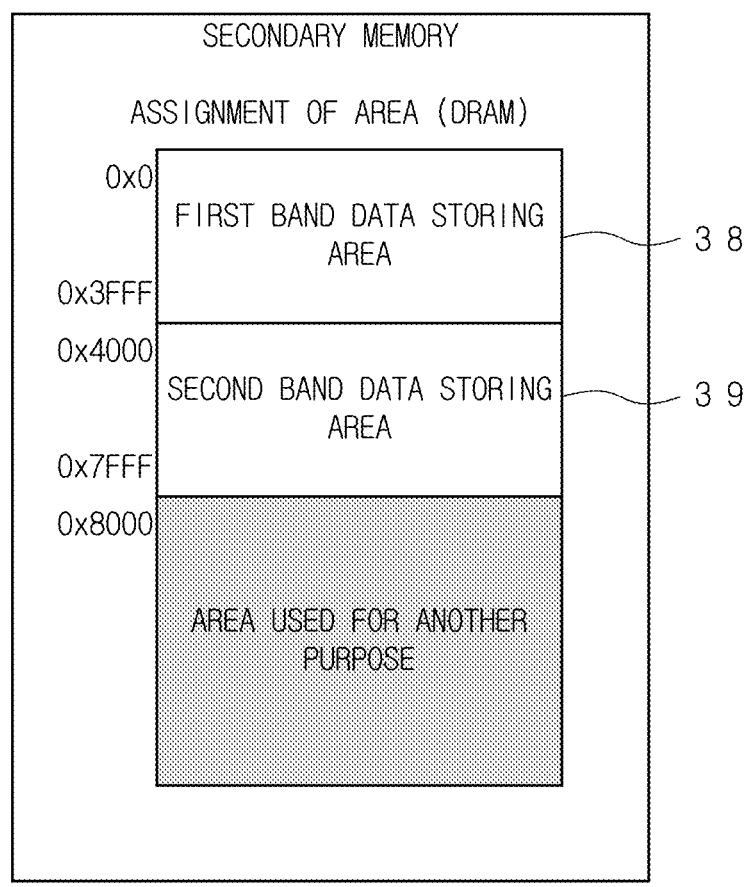
FIG. 8 is a view showing the first band data storing area and the second band data storing area provided in the secondary memory.

The secondary memory 32 is a memory provided outside the image processing circuit 33. The secondary memory 32 is a DRAM. As shown in FIG. 8, in the secondary memory 32, the first band data storing area 38 and the second band data storing area 39 are provided. Each of the first band data storing area 38 and the second band data storing area 39 stores the positional correction amount data for one or more lines. In this case, each of the first band data storing area 38 and the second band data storing area 39 stores the positional correction amount data for four lines. In this example, two band data storing areas 38 and 39 are provided. The necessary number of the band data storing areas is at least two, and the number of the band data storing areas may be three or more.

The reference memory 36 is the SRAM provided in the image processing circuit 33. The reference memory 36 holds the positional correction amount data for each pixel in one line in the horizontal direction. The reference memory 36 corresponds to the reference memory 15 of the image deformation device 10. Like the image processing circuit 22 shown in FIG. 5, two reference memories 36 may be provided and the transfer destination switching unit 25 and the selector 28 may be provided in the image processing circuit 33. Then, like the second embodiment, two reference memories may be used alternately.

The transfer control unit 34 transfers the positional correction amount data stored in the primary memory 31 to the secondary memory 32 as the first transfer unit, separately in multiple times. The transfer control unit 34 transfers the positional correction amount data in units of lines stored in one band data storing area, from the primary memory 31 to the secondary memory 32. In this example, the transfer control unit 34 transfers the positional correction amount data in units of four lines. At this time, the transfer control unit 34 switches the transfer destination of the positional correction amount data output from the primary memory 31 in units of four lines between the first band data storing area 38 and the second band data storing area 39.

Further, the transfer control unit 34 transfers the positional correction amount data stored in the secondary memory 32 to the reference memory 36 as the second transfer unit, separately in multiple times. This transfer is carried out in units of the positional correction amount data for one line. Further, the transfer control unit 34 switches the band data storing area from which the positional correction amount data is read out, by lines stored in one band data storing area. In this example, every when the positional correction amount data for four lines is transferred, the transfer control unit 34 switches the band data storing area from which the positional correction amount data is read out, between the first band data storing area 38 and the second band data storing area 39 alternately.

That is, the transfer control unit 34 sequentially transfers the positional correction amount data for four lines, which is stored in the first band data storing area 38, to the reference memory 36, separately in four separate times according to the progress of the positional correction process. During this transfer, the transfer control unit 34 transfers the positional correction amount data for next four lines from the primary memory 31 to the second band data storing area 39. Next, when the transfer of the positional correction amount data for four lines, which is stored in the first band data storing area 38, to the reference memory 36 is finished, the transfer control unit 34 switches the transfer source to the second band data storing unit 39. Then, the transfer control unit 34 sequentially transfers the positional correction amount data for four lines, which is stored in the second band data storing area 39, to the reference memory 36, separately in four separate times according to the progress of the positional correction process. During this transfer, the transfer control unit 34 transfers the positional correction amount data for next four lines from the primary memory 31 to the first band data storing area 38. The transfer control unit 34 repeats the above operation.

Figure 9:
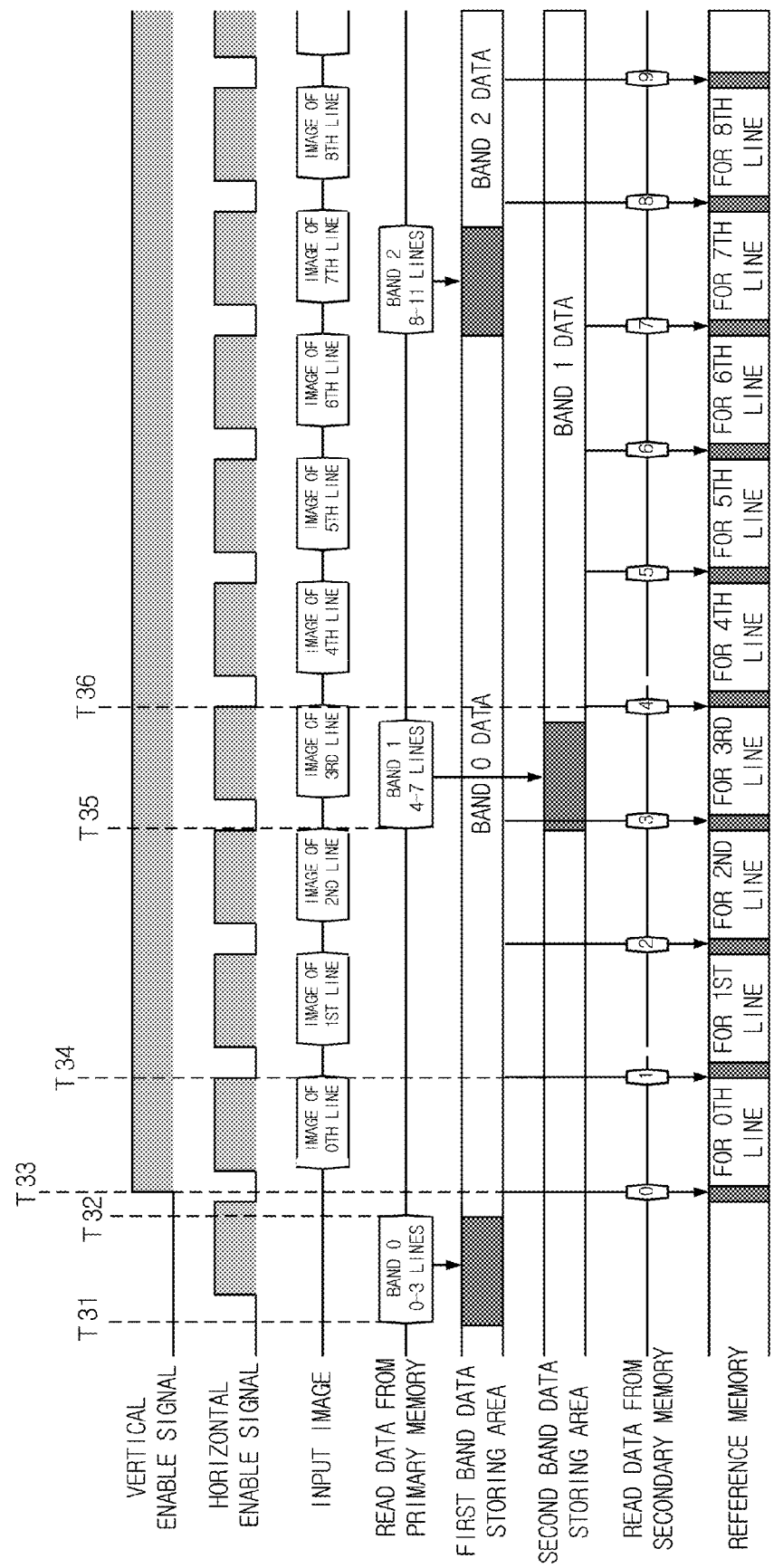
FIG. 9 is a timing chart showing the operation of the image deformation device according to the third embodiment.

FIG. 9 is a timing chart showing the operation of the image deformation device 30. Firstly, before the vertical enable signal is switched ON, the positional correction amount data to be stored in one band data storing area from the top line of the page (in this example, the positional correction amount data for four lines from the 0th line to the third line), is transferred from the primary memory 31 to the first band data storing area 38 of the secondary memory 32 (time T31 to T32).

Next, when the vertical enable signal is switched ON (time T33), the positional correction amount data for one line corresponding to the 0th line is transferred from the first band data storing area 38 of the secondary memory 32 to the reference memory 36. The positional correction unit 37 corrects the position of each pixel in the image data of one line, which is input when the horizontal enable signal is ON, by referring to the positional correction amount data stored in the reference memory 36 while the horizontal enable signal is ON.

When the falling edge of the horizontal enable signal for 0th line is detected (time T34), the positional correction amount data for one line corresponding to the first line is transferred from the first band data storing area 38 to the reference memory 36. Then, every when the falling edge of the horizontal enable signal is detected, the positional correction amount data for one line corresponding to the second line and the third line in order, is transferred to the reference memory 36 line by line.

As described above, while the positional correction amount data for four lines, which is stored in the first band data storing area 38, is transferred to the reference memory 36, the transfer control unit 34 transfers the positional correction amount data for next four lines from the primary memory 31 to the second band data storing area 39 of the secondary memory 32. In the example shown in FIG. 9, the transfer of the positional correction amount data for four lines to the second band data storing area 39 is started at the falling of the horizontal enable signal for the second line (time T35), and is finished before the falling of the horizontal enable signal for the third line. In case that it takes a long time to transfer the positional correction amount data for four lines, the starting timing of the above transfer may be advanced.

When the falling edge of the horizontal enable signal for the third line is detected (time T36), the positional correction amount data for one line corresponding to the fourth line is transferred from the second band data storing area 39 to the reference memory 36. Then, every when the falling edge of the horizontal enable signal is detected, the positional correction amount data for one line corresponding to the fifth line, the sixth line and the seventh line in order, is transferred to the reference memory 36 line by line. During the above transfer, the positional correction amount data for four lines corresponding to the eighth line to the eleventh line is transferred from the primary memory 31 to the first band data storing area 38 of the secondary memory 32.

By repeating the above operation, the positional correction amount data is sequentially transferred from the primary memory 31 to the reference memory 36 via the secondary memory 32. Then, the positional correction unit 37 corrects the position of each pixel in the image data of one line, which is input when the horizontal enable signal is ON, by referring to the positional correction amount data stored in the reference memory 36 while the horizontal enable signal is ON.

In the image deformation device 30 according to the third embodiment, it is possible to sufficiently suppress the memory size of the DRAM used as the secondary memory 32.

Fourth Embodiment

In case that the positional correction amount data is held for each pixel as the actual value, the reference memory is required to have a very large memory size. Even though only the positional correction amount data for one line is held in the image processing circuit 12 or the like, the memory for holding the data is required to have a large memory size. In the fourth embodiment, the positional correction amount data is compressed and is stored. Then, by expanding and using the positional correction amount data before the positional correction process is carried out, the memory size of the SRAM provided in the image processing circuit 12 or the like to hold the positional correction amount data is reduced.

In this embodiment, instead of the positional correction amount data, the differential data between the adjacent pixels is held. That is, the differential data indicates the difference in the shift amount (positional correction amount) of each pixel with respect to the position of the pixel which is arranged before the position of the pixel is corrected, between one pixel and the pixel adjacent to the one pixel. Because the difference in the positional correction amount between the adjacent pixels is small, the number of bits to be assigned to the positional correction amount of each pixel becomes small. As a result, the data size thereof is reduced.

Figure 10:
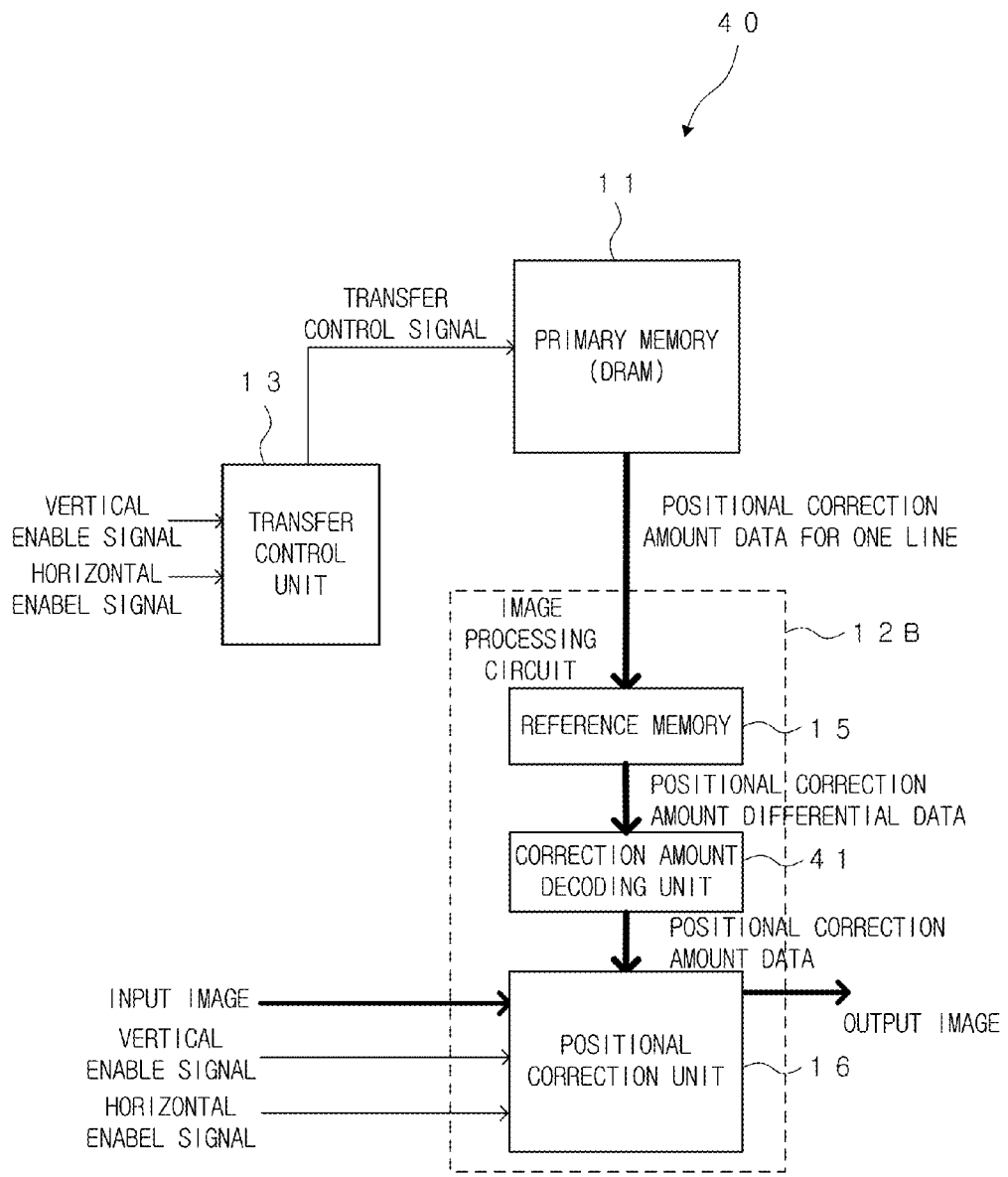
FIG. 10 is a block diagram showing the schematic configuration of the image deformation device according to the fourth embodiment.

FIG. 10 is a block diagram showing the schematic configuration of the image deformation device 40 according to the fourth embodiment. The elements of the image deformation device 40, which are the same as those of the image deformation device 10 shown in FIG. 1 are denoted by the same reference numerals as those of the first embodiment. The explanation thereof is appropriately omitted.

In the image deformation device 40, the correction amount decoding unit 41 is provided between the reference memory 15 and the positional correction unit 16 in the image processing circuit 12B. The correction amount decoding unit 41 decodes the differential data which is read out from the reference memory 15, to the positional correction amount data indicating the positional correction amount by using the actual value. The positional correction unit 16 does not refer to the data in the reference memory 15, but uses the decoded positional correction amount data output from the correction amount decoding unit 41 to carry out the positional correction process.

In the image deformation device 40 according to the fourth embodiment, the differential data for one line is transferred from the primary memory 11 to the reference memory 15. The differential data read out from the reference memory 15 is decompressed to the original positional correction amount data by the correction amount decoding unit 41. The decompressed positional correction amount data is output to the positional correction unit 16. In the image deformation device 40 according to the fourth embodiment, because the differential data obtained by compressing the positional correction amount data is held in the primary memory 11 and the reference memory 15, the memory size which is required for the primary memory 11 and the reference memory 15 is small as compared with the first embodiment.

Figure 11A:
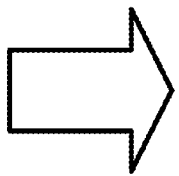
FIGS. 11A to 11D are views showing an example of the change in the data in case that the differential data is obtained from the positional correction amount data and the position of each pixel is corrected by decoding the differential data to the original positional correction amount data.

FIGS. 11A to 11D show an example of the change in the data in case that the differential data is obtained from the positional correction amount data and the position of each pixel is corrected by decoding the differential data to the original positional correction amount data. FIG. 11A shows the original positional correction amount data and indicates the actual value of the positional correction amount for each pixel in the input image. For example, in the drawings, the indication "+2/+1" indicates that the shift amount in the horizontal direction is +2 and the shift amount in the vertical direction is +1.

Figure 11B:
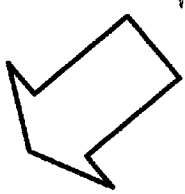

FIG. 11B shows the differential data which is obtained from the positional correction amount data indicated by using the actual values shown in FIG. 11A. In this example, the upper left corner pixel (in the drawing, the pixel which is indicated by the black circle) is the reference pixel. Each arrow shown in FIG. 11B indicates the referring direction for showing the rule in which the difference in the shift amount is calculated by subtracting the shift amount of the pixel arranged on the side of the shaft of the arrow from the shift amount of the pixel arranged on the side of the arrowhead of the arrow. In case of the pixels of which the adjacent pixel exists on the left side, the positional correction amount data of the pixel is converted to the difference in the positional correction amount between the pixel and the adjacent pixel which exists on the left side of the pixel. In case of the pixels which are arranged on the left end, the positional correction amount data of the pixel is converted to the difference in the positional correction amount between the pixel and the adjacent pixel which exists on the upper side of the pixel. In the primary memory 11, the differential data shown in FIG. 11B is previously stored.

Figure 11C:
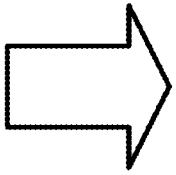
Figure 11D:
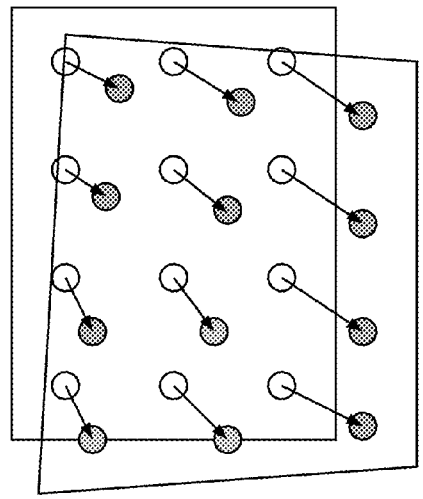
Figure 12:
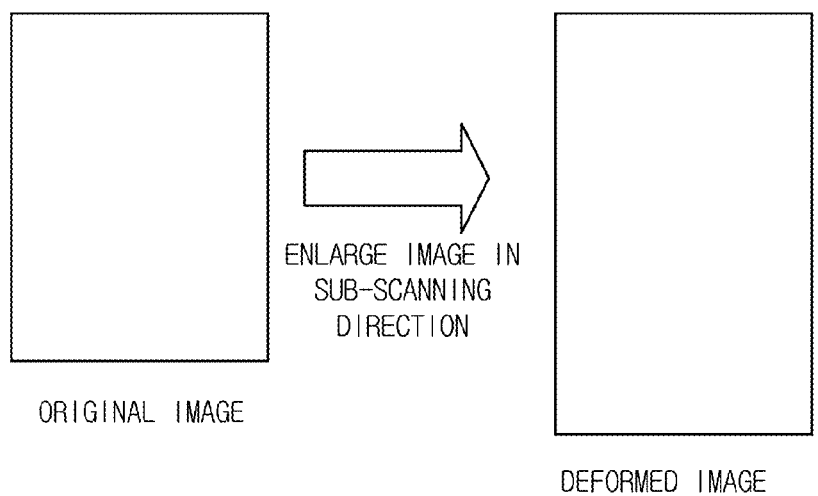
FIG. 12 is a view showing an example of the image deformation for enlarging an original image.
Figure 13:
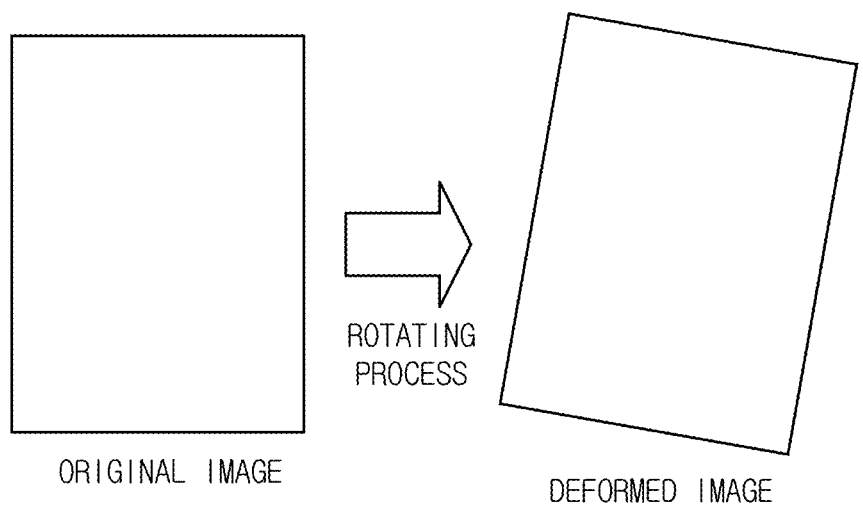
FIG. 13 is a view showing an example of the image deformation for rotating an original image.
Figure 14:
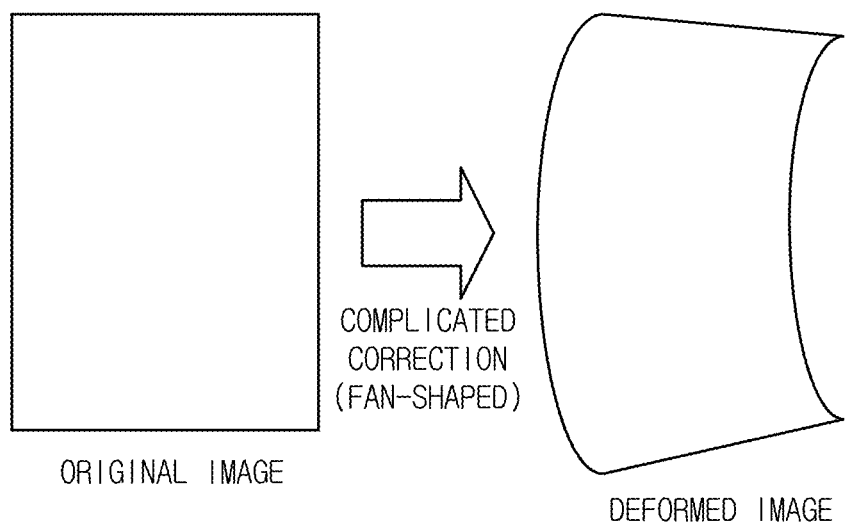
FIG. 14 is a view showing an example in which an original image is complicatedly deformed.
Figure 15:
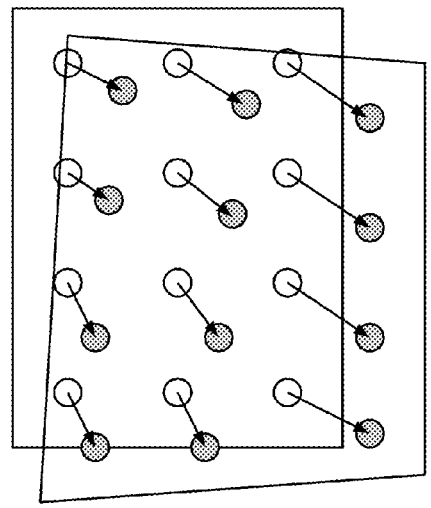
FIG. 15 is a view showing an example of the image deformation in which the position of each pixel is shifted in accordance with the positional correction amount for each pixel.

FIG. 11C shows the situation in which the differential data shown in FIG. 11B is decoded by the correction amount decoding unit 41 to the positional correction amount data indicated by using the actual value. FIG. 11D simulatively shows the situation in which the positional correction unit 16 shifts and corrects the position of each pixel in accordance with the decoded positional correction amount data. In FIG. 11D, each white circle indicates the position of the pixel which is arranged before the correction, and each gray circle indicates the corrected position of the pixel.

According to the first to the fourth embodiments, it is possible to suppress the necessary memory size of the memory provided in the image processing circuit 12 or the like, and to precisely and complicatedly deform the image data by the correction in accordance with the positional correction amount data for each pixel.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In the embodiments, the positional correction amount data for each pixel is held. However, the positional correction amount data obtained by the thinning out may be used. In the positional correction unit, the positional correction amount corresponding to the position of each pixel in the input image is calculated by carrying out the interpolation process for the above positional correction amount data to carry out the positional correction process. For example, when the positional correction amount data is thinned at the interval of one pixel, the data size thereof can be halved.

In the embodiments, the unit of the data transfer is set to the positional correction amount data for one line. The unit of the data transfer is not limited, and may be suitably set. For example, in case that the positional correction amount data for two lines can be transferred during the invalid time region, the unit of the data transfer may be set to the positional correction amount data for two lines. On the other hand, in case of the configuration shown in the second embodiment in which the reference memory is divided into the first reference memory 26 and the second reference memory 27 and the destination of the positional correction amount data is switched between the first reference memory 26 and the second reference memory 27 alternately, it is possible to transfer the positional correction amount data for one line, separately in multiple times.

The secondary memory 32 explained in the third embodiment may be configured, for example, as a ring buffer which can hold the positional correction amount data for 16 lines or the like.

One of the objects of the above embodiments is to provide an image deformation device which can sufficiently suppress the memory size of the memory for storing the positional correction amount data for each pixel to which the correction unit refers, and which can precisely and complicatedly deform the image data.

In at least one of the embodiments, the positional correction amount data for each pixel in the whole input image is held in the primary memory. Then, the positional correction amount data is sequentially transferred from the primary memory to the reference memory, separately in multiple times according to the order and the progress of the process in the positional correction unit.

In at least one of the embodiments, the transfer unit transfers positional correction amount data for one line in the first direction as a unit of data transfer from the primary memory to the reference memory.

In at least one of the embodiments, by switching the transfer destination of the positional correction amount data between the first reference memory and the second reference memory alternately, while the positional correction unit carries out the positional correction process by referring to the data in the first reference memory, the next positional correction amount data is transferred from the primary memory to the second reference memory. Further, while the positional correction unit carries out the positional correction process by referring to the data in the second reference memory, the next positional correction amount data is transferred from the primary memory to the first reference memory.

In at least one of the embodiments, the positional correction amount data for each pixel in the whole input image is held in the primary memory. Then, the positional correction amount data is transferred from the primary memory to the secondary memory and is further transferred from the secondary memory to the reference memory, separately in multiple times according to the order and the progress of the positional correction process in the positional correction unit.

In at least one of the embodiments, the second transfer unit transfers the positional correction amount data for one line in the first direction as a unit of data transfer from the secondary memory to the reference memory.

In at least one of the embodiments, the positional correction amount data indicates the actual value of the shift amount.

In at least one of the embodiments, the positional correction amount data indicates the difference in the shift amount between the adjacent pixels.

In at least one of the embodiments, the reference memory is integrated in the integrated circuit.

According to the image deformation device, it is possible to sufficiently suppress the memory size of the memory for storing the positional correction amount data for each pixel to which the correction unit refers, and to precisely and complicatedly deform the image data.

The present U.S. patent application claims the priority of Japanese Patent Application No. 2014-205702, filed on Oct. 6, 2014, according to the Paris Convention, and the entirety of which is incorporated herein by reference for correction of incorrect translation.

What is claimed is:

1. An image deformation device for deforming an input image by correcting a position of each pixel in the input image, comprising:
    a primary memory in which a positional correction amount data for each pixel, which is used for correcting the position of each pixel, is stored;
    a reference memory having a smaller storing area than the primary memory;
    a transfer unit configured to transfer the positional correction amount data stored in the primary memory to the reference memory separately in multiple times; and
    a positional correction unit configured to carry out a positional correction process in which the position of each pixel in the input image is sequentially corrected in a predetermined order in accordance with the positional correction amount data stored in the reference memory,
    wherein the transfer unit transfers the positional correction amount data according to the predetermined order and a progress of the positional correction process in the positional correction unit so that the positional correction amount data for one pixel has been already stored in the reference memory when the positional correction unit corrects the position of the one pixel.

2. The image deformation device of claim 1, wherein in the input image, the pixels are arranged in a first direction and in a second direction which is perpendicular to the first direction,
    the predetermined order is an order in which the position of each pixel in one line in the first direction is corrected sequentially from a top line to a bottom line along the second direction, and
    the transfer unit transfers the positional correction amount data for the one line in the first direction as a unit of data transfer.

3. The image deformation device of claim 1, wherein the primary memory is a dynamic random access memory.

4. The image deformation device of claim 1, wherein the reference memory comprises a first reference memory and a second reference memory,
    every when the positional correction unit corrects the positions of a predetermined number of the pixels, the positional correction unit switches a reference destination of the positional correction amount data between the first reference memory and the second reference memory alternately, and
    the transfer unit transfers the positional correction amount data for the predetermined number of the pixels as a unit of data transfer, by switching a transfer destination of the positional correction amount data between the first reference memory and the second reference memory alternately.

5. An image deformation device for deforming an input image by correcting a position of each pixel in the input image, comprising:
    a primary memory in which a positional correction amount data for each pixel, which is used for correcting the position of each pixel, is stored;
    a secondary memory having a small storing area than the primary memory;
    a reference memory having a small storing area than the secondary memory;
    a first transfer unit configured to carry out a first transfer in which the positional correction amount data stored in the primary memory is transferred to the secondary memory separately in multiple times;
    a second transfer unit configured to carry out a second transfer in which the positional correction amount data stored in the secondary memory is transferred to the reference memory separately in multiple times; and
    a positional correction unit configured to carry out a positional correction process in which the position of each pixel in the input image is sequentially corrected in a predetermined order in accordance with the positional correction amount data stored in the reference memory,
    wherein the second transfer unit carries out the second transfer according to the predetermined order and a progress of the positional correction process in the positional correction unit so that the positional correction amount data for one pixel has been already stored in the reference memory when the positional correction unit corrects the position of the one pixel, and
    the first transfer unit carries out the first transfer according to the predetermined order and the progress of the positional correction process in the positional correction unit so that the positional correction amount data for the one pixel has been already stored in the secondary memory when the second transfer unit transfers the positional correction amount data for the one pixel to the reference memory.

6. The image deformation device of claim 5, wherein in the input image, the pixels are arranged in a first direction and in a second direction which is perpendicular to the first direction,
    the predetermined order is an order in which the position of each pixel in one line in the first direction is corrected sequentially from a top line to a bottom line along the second direction, and
    the second transfer unit carries out the second transfer in which the positional correction amount data for the one line in the first direction is transferred as a unit of data transfer.

7. The image deformation device of claim 5, wherein the primary memory is a dynamic random access memory.

8. The image deformation device of claim 1, wherein the positional correction amount data indicates a shift amount of each pixel with respect to the position of the pixel which is arranged before the position of the pixel is corrected.

9. The image deformation device of claim 5, wherein the positional correction amount data indicates a shift amount of each pixel with respect to the position of the pixel which is arranged before the position of the pixel is corrected.

10. The image deformation device of claim 1, wherein the positional correction amount data indicates a difference in a shift amount of each pixel with respect to the position of the pixel which is arranged before the position of the pixel is corrected, between the one pixel and an adjacent pixel which is adjacent pixel to the one pixel.

11. The image deformation device of claim 5, wherein the positional correction amount data indicates a difference in a shift amount of each pixel with respect to the position of the pixel which is arranged before the position of the pixel is corrected, between the one pixel and an adjacent pixel which is adjacent pixel to the one pixel.

12. The image deformation device of claim 1, wherein the positional correction amount data obtained by a thinning out is used, and the positional correction unit calculates the positional correction amount for each pixel in the input image by an interpolation process which is carried out for the positional correction amount data obtained by the thinning out, and carries out the positional correction process.

13. The image deformation device of claim 5, wherein the positional correction amount data obtained by a thinning out is used, and the positional correction unit calculates the positional correction amount for each pixel in the input image by an interpolation process which is carried out for the positional correction amount data obtained by the thinning out, and carries out the positional correction process.

14. The image deformation device of claim 1, wherein the reference memory and the positional correction unit are integrated in an integrated circuit, and the primary memory is provided outside the integrated circuit.

15. The image deformation device of claim 5, wherein the reference memory and the positional correction unit are integrated in an integrated circuit, and the primary memory is provided outside the integrated circuit.

* * * * *